(12) United States Patent
Nakagawa et al.

(10) Patent No.: US 9,050,745 B2
(45) Date of Patent: Jun. 9, 2015

(54) IN-MOLD DECORATION MOLDING METHOD AND IN-MOLD DECORATION MOLDING MACHINE

(71) Applicant: Panasonic Corporation, Kadoma-shi, Osaka (JP)

(72) Inventors: Takashi Nakagawa, Osaka (JP); Masakazu Hiraishi, Kyoto (JP); Akira Yabe, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 88 days.

(21) Appl. No.: 14/075,859

(22) Filed: Nov. 8, 2013

(65) Prior Publication Data

US 2014/0239550 A1    Aug. 28, 2014

(30) Foreign Application Priority Data

Feb. 22, 2013    (JP) .................................. 2013-032680

(51) Int. Cl.
*B29C 45/14*    (2006.01)

(52) U.S. Cl.
CPC ..... *B29C 45/14262* (2013.01); *B29C 45/14065* (2013.01); *B29C 45/14016* (2013.01)

(58) Field of Classification Search
CPC .................................. B29C 45/14016; B29C 45/14262–2045/14278
See application file for complete search history.

(56) References Cited

U.S. PATENT DOCUMENTS

2010/0059172 A1    3/2010 Yamamoto et al.

FOREIGN PATENT DOCUMENTS

| JP | 10-034704 |   | 2/1998 |
|----|-----------|---|--------|
| JP | 11-277568 | * | 10/1999 |
| JP | 3111083   | * | 11/2000 |
| JP | 2011-025531 |  | 2/2011 |

* cited by examiner

*Primary Examiner* — Jill Heitbrink
(74) *Attorney, Agent, or Firm* — Hamre, Schumann, Mueller & Larson, P.C.

(57) ABSTRACT

The surfaces of a decorated sheet are tilted with respect to a parting face before a movement of a clamping member. When the clamping member moves to press the decorated sheet under tension to the parting face, a part of the clamping member first comes into contact with the decorated sheet at a position determined by inclination of the surfaces of the decorated sheet and then another portion of the clamping member comes into contact with the decorated sheet.

14 Claims, 6 Drawing Sheets

IN-MOLD DECORATION MOLDING METHOD AND IN-MOLD DECORATION MOLDING MACHINE

TECHNICAL FIELD

The present invention relates to in-mold decoration molding for obtaining molded articles with decoration.

BACKGROUND ART

In-mold decoration molding is used for producing injection-molded articles with patterns. An in-mold decoration molding method includes the steps of: disposing a pattern of a decorated sheet in a molding space (cavity) formed in molds serving as forming dies; injecting molten resin into the molding space; and removing a molded article (product) from the molding space. According to the in-mold decoration molding method, the pattern held on the decorated sheet is transferred to the surface of the molded article in a resin injection molding process. Thus, the molded article is obtained with decoration. A typical in-mold decoration molding process includes the following steps:

First, a roll of a decorated sheet is prepared. The decorated sheet includes a base sheet and a transfer layer disposed on the base sheet. The transfer layer includes a decorated layer having a printed pattern. The transfer layer may include a functional layer stacked on the decorated layer. The functional layer may be adjacent to the decorated layer, or another layer may be interposed between the decorated layer and the functional layer.

Subsequently, the long decorated sheet is fed between an opened movable mold and an opened stationary mold. When the movable and stationary molds are closed, the pattern held on the decorated sheet is disposed at a position corresponding to a molding space formed between the movable mold and the stationary mold.

After that, a clamping member is moved to hold the decorated sheet on the parting face of the movable mold, and then the decorated sheet is sucked to the cavity face of the movable mold.

The movable mold is then moved into contact with the stationary mold (closed). After that, a predetermined amount of molten resin is injected into the molding space formed between the movable mold and the stationary mold.

Subsequently, the resin injected into the molding space is cooled. This solidifies the resin into a molded article. The movable mold is then moved away from the stationary mold (opened). At this point, the transfer layer is peeled from the base sheet and then is transferred to the surface of the molded article. Thus, the decorated layer or the decorated layer and the functional layer in the transfer layer are transferred to the surface of the molded article.

Finally, the molded article is removed from the opened molds. The surface of the molded article is decorated with the pattern printed on the decorated layer.

For example, Japanese Patent Laid-Open No. 2011-025531 discloses a molding machine for realizing the typical in-mold decoration molding process. FIGS. 6A and 6B illustrate the molding machine described in Japanese Patent Laid-Open No. 2011-025531. Specifically, FIG. 6A is a cross-sectional view schematically illustrating the molding machine described in Japanese Patent Laid-Open No. 2011-025531. The molding machine in FIG. 6A includes a pair of molding/decorating dies 60 serving as shaping dies for injection molding of resin materials. The pair of molding/decorating dies 60 includes an A die 61 and a B die 62. FIG. 6B is a schematic plan view illustrating a part face (parting face) 63 of the A die 61.

The molding machine illustrated in FIGS. 6A and 6B includes a clamping member 64 and a sheet feeder 70. The sheet feeder 70 includes a sheet roll 71 and a winding roll 72. The sheet feeder 70 feeds a decorated sheet 73 from the sheet roll 71 to the winding roll 72 when the pair of molding/decorating dies 60 is opened. Thus, a pattern 73a held on the decorated sheet 73 is disposed between the A die 61 and the B die 62. When the pattern 73a is positioned, the clamping member 64 presses the decorated sheet 73 to the part face 63 of the A die 61.

When the clamping member 64 holds the decorated sheet 73 on the part face 63 of the A die 61, the decorated sheet 73 is sucked to a cavity face 65 of the A die 61. After that, the A die 61 and the B die 62 are closed. This allows the pair of molding/decorating dies 60 to contain the decorated sheet 73.

Subsequently, molten resin is injected onto the contained decorated sheet 73 from an injection port 66 formed on the B die 62. Thus, the injected resin fills a molding space formed in the pair of closed molding/decorating dies 60.

The molten resin injected into the molding space is cooled and thus is solidified into an injection-molded body (molded article). When the resin is solidified, the A die 61 and the B die 62 are opened. At this point, the transfer layer is peeled from the decorated sheet 73 and is transferred to the surface of the injection-molded body.

When the A die 61 and the B die 62 are opened, the decorated injection-molded body is removed from the pair of molding/decorating dies 60. As has been discussed, the transfer layer includes the decorated layer having the printed pattern 73a and thus the pattern 73a is transferred to the surface of the removed injection-molded body. A layer (transfer layer) formed by transfer to the surface of the injection-molded body may have a multilayer structure in which a functional layer or the like is stacked on the decorated layer with a printed pattern so as to provide functions, e.g., UV protection for the surface of the injection-molded body.

In in-mold decoration molding, a pattern held on a decorated sheet needs to be transferred to the surface of a molded body (molded article) with high positioning accuracy such that the molded article is decorated with an excellent appearance. Thus, it is important to align the pattern of the decorated sheet and the cavity face of the die. For example, as described in Japanese Patent Laid-Open No. 10-034704, a positioning mark printed beforehand on a decorated sheet is detected by a camera or a sensor to position the pattern of the decorated sheet.

DISCLOSURE OF THE INVENTION

In the positioning of the pattern of the decorated sheet, the positioning mark printed beforehand on the decorated sheet is detected by a camera or a sensor before a clamping member comes into contact with the decorated sheet, thereby aligning the pattern of the decorated sheet and the cavity face of a die. In the positioning of the pattern of the decorated sheet, however, the pattern of the decorated sheet is displaced from a desired position when the decorated sheet is fixed on the parting face of the die by the clamping member.

The pattern of the decorated sheet is displaced because the decorated sheet is separated from the cavity face of the die before the clamping member comes into contact with the decorated sheet and because tension is applied to the decorated sheet in the feeding direction of the decorated sheet. Specifically, when the pattern of the decorated sheet is positioned before the clamping member comes into contact with the decorated sheet, various rolls disposed on both sides of the dies (e.g., the sheet roll 71, the winding roll 72, and guide rolls 74 and 75 in the molding machine of FIG. 6A) typically apply tension to the long decorated sheet in the feeding direction of the decorated sheet so as to prevent deformation of the decorated sheet. The positions of the central axes of the rolls are typically adjusted so as to prevent the decorated sheet from coming into contact with the parting face of the die before the clamping member comes into contact with the decorated sheet. Hence, when the decorated sheet is fixed by the clamping member, the position of the pattern of the decorated sheet changes from an initial position before the clamping member comes into contact with the decorated sheet, because of balance between the tension applied to the decorated sheet by the rolls and tension applied to the decorated sheet by the movement of the clamping member.

Furthermore, the positions of the central axes of the rolls on both sides of the dies are typically adjusted so as to locate the decorated sheet in parallel or substantially in parallel with the parting face of the die before the clamping member comes into contact with the decorated sheet. However, even if the decorated sheet is located in parallel or substantially in parallel with the parting face of the die, the first contact position of the clamping member with the decorated sheet varies as long as the members of the molding machine actually have a dimension error and an alignment error. This varies the tension applied to the decorated sheet by the movement of the clamping member. Consequently, before the clamping member comes into contact with the decorated sheet, even if the pattern of the decorated sheet is positioned in consideration of balance between tension applied to the decorated sheet by the rolls and tension applied to the decorated sheet by the movement of the clamping member, the pattern of the decorated sheet fixed by the clamping member is displaced from a desired position. Thus, the pattern of the decorated sheet is displaced also because the first contact position of the clamping member with the decorated sheet is varied by a dimension error and an alignment error of the members of the molding machine.

As has been discussed, when the pattern of the decorated sheet is positioned while the decorated sheet is held on the parting face of the die by the clamping member, the pattern of the decorated sheet is displaced from the desired position. This may reduce the positioning accuracy of the pattern on the surface of the molded body. If the pattern transferred to the surface of the molded article contains a logo requiring high positioning accuracy, a displacement of the logo pattern is a major factor leading to a faulty appearance of the molded article.

An object of the present invention is to provide an in-mold decoration molding method and an in-mold decoration molding machine that can improve the appearance of a molded article.

An aspect of an in-mold decoration molding method according to the present invention in which a part of a long decorated sheet is disposed in a molding space formed in dies, and then a pattern held on a decorated sheet is transferred to the surface of a molded article while molten resin is injected into the molding space so as to be injection-molded into the molded article, the method including the steps of: disposing the part of the decorated sheet in a range of the molding space with the surfaces of the long decorated sheet tilted with respect to the parting face of the opened dies while applying tension to the decorated sheet in the feeding direction of the decorated sheet; and moving a clamping member to the parting face so as to press the decorated sheet under tension to the parting face by means of the clamping member such that a part of the clamping member first comes into contact with the decorated sheet at a position determined by inclination of the surfaces of the decorated sheet and then another portion of the clamping member comes into contact with the decorated sheet.

Another aspect of the in-mold decoration molding method according to the present invention, wherein the long decorated sheet is looped over a pair of rolls opposed to each other with the dies interposed between the rolls such that the central axes of the rolls are disposed in opposite directions with respect to a plane flush with the parting face of the opened dies or are disposed in an identical direction with respect to the plane and at different distances from the plane, and the surfaces of the decorated sheet are tilted with respect to the parting face at an angle corresponding to the positions of the central axes of the rolls in the feeding direction of the decorated sheet before the movement of the clamping member.

Another aspect of the in-mold decoration molding method according to the present invention, wherein the long decorated sheet is looped over a pair of rolls opposed to each other with the dies interposed between the rolls such that the central axes of the rolls are tilted with respect with a plane flush with the parting face of the opened dies, and the surfaces of the decorated sheet are tilted with respect to the parting face at an angle corresponding to inclination of the central axes of the rolls in a direction orthogonal to the feeding direction of the decorated sheet before the movement of the clamping member.

Another aspect of the in-mold decoration molding method according to the present invention, wherein the long decorated sheet is looped over a pair of rolls opposed to each other with the dies interposed between the rolls such that the central axes of the rolls are tilted with respect with a plane flush with the parting face of the opened dies and are disposed in opposite directions with respect to the plane, or are disposed in an identical direction with respect to the plane and at different distances from the plane, and the surfaces of the decorated sheet are tilted with respect to the parting face at an angle corresponding to inclination of the central axes of the rolls in a direction orthogonal to the feeding direction of the decorated sheet and are tilted with respect to the parting face at an angle corresponding to positions of the central axes of the rolls in the feeding direction of the decorated sheet before the movement of the clamping member.

Another aspect of the in-mold decoration molding method according to the present invention, wherein when the clamping member moves, the method further includes the step of: fixing the decorated sheet with respect to the clamping member by means of an anti-slip member at the first contact position of the clamping member with the decorated sheet, the anti-slip member protruding from the surface of the clamping member facing the decorated sheet. The anti-slip member is, for example, an O ring.

Another aspect of the in-mold decoration molding method according to the present invention, wherein the decorated sheet is tilted with respect to the parting face such that a reference point for a predetermined portion of the decorated sheet is located closer to the first contact position of the clamping member with the decorated sheet than the final contact position of the clamping member with the decorated sheet.

An aspect of an in-mold decoration molding machine according to the present invention in which a part of a long decorated sheet is disposed in a molding space formed in dies, and then a pattern held on the decorated sheet is transferred to the surface of a molded article while molten resin is injected into the molding space so as to be injection-molded into the molded article, the in-mold decoration molding machine including: the openable molds that are opened with a parting face and are closed so as to form the molding space; a sheet feeder including a sheet feeding unit and a sheet storage unit, the sheet feeder disposing the part of the decorated sheet in a range of the molding space by feeding the decorated sheet from the sheet feeding unit to the opened dies with the surfaces of the decorated sheet tilted with respect to the parting face of the opened dies while applying tension to the long decorated sheet in a feeding direction of the decorated sheet, and storing the decorated sheet from the opened dies in the sheet storage unit; and a clamping member that moves to the parting face so as to press the decorated sheet under tension to the parting face such that the clamping member first comes into contact with the decorated sheet at a position determined by inclination of the surfaces of the decorated sheet and then comes into contact with the decorated sheet at another position.

An aspect of the in-mold decoration molding machine according to the present invention, wherein each of the sheet feeding unit and the sheet storage unit includes a roll, the long decorated sheet being looped over the rolls opposed to each other with the dies interposed between the rolls such that the central axes of the rolls are disposed in opposite directions with respect to a plane flush with the parting face of the opened dies or are disposed in an identical direction with respect to the plane and at different distances from the plane, and the surfaces of the decorated sheet are tilted with respect to the parting face at an angle corresponding to the positions of the central axes of the rolls in the feeding direction of the decorated sheet before the movement of the clamping member.

An aspect of the in-mold decoration molding machine according to the present invention, wherein each of the sheet feeding unit and the sheet storage unit includes a roll, the long decorated sheet being looped over the rolls opposed to each other with the dies interposed between the rolls such that the central axes of the rolls are tilted with respect with a plane flush with the parting face of the opened dies, and the surfaces of the decorated sheet are tilted with respect to the parting face at an angle corresponding to inclination of the central axes of the rolls in a direction orthogonal to the feeding direction of the decorated sheet before the movement of the clamping member.

An aspect of the in-mold decoration molding machine according to the present invention, wherein each of the sheet feeding unit and the sheet storage unit includes a roll, the long decorated sheet being looped over the rolls opposed to each other with the dies interposed between the rolls such that the central axes of the rolls are tilted with respect with a plane flush with the parting face of the opened dies and are disposed in opposite directions with respect to the plane, or are disposed in an identical direction with respect to the plane and at different distances from the plane, and the surfaces of the decorated sheet are tilted with respect to the parting face at an angle corresponding to inclination of the central axes of the rolls in a direction orthogonal to the feeding direction of the decorated sheet and are tilted with respect to the parting face at an angle corresponding to the positions of the central axes of the rolls in the feeding direction of the decorated sheet before the movement of the clamping member.

An aspect of the in-mold decoration molding machine according to the present invention further includes an anti-slip member that protrudes from the surface of the clamping member facing the decorated sheet, the anti-slip member fixing the decorated sheet with respect to the clamping member at the first contact position of the clamping member with the decorated sheet. The anti-slip member is, for example, an O ring.

An aspect of the in-mold decoration molding machine according to the present invention, wherein the decorated sheet is tilted with respect to the parting face such that a reference point for a predetermined portion of the decorated sheet is located closer to the first contact position of the clamping member with the decorated sheet than the final contact position of the clamping member with the decorated sheet.

According to the present invention, a part of the clamping member first comes into contact with the decorated sheet at a position determined by inclination of the surfaces of the decorated sheet, and then another portion of the clamping member comes into contact with the decorated sheet. In other words, the first contact position of the decorated sheet with the clamping member is specified according to the inclination of the surfaces of the decorated sheet. The pattern transferred to the surface of the molded article may be displaced by tension applied in the feeding direction of the decorated sheet when the clamping member presses the decorated sheet to the parting face, but the pattern is hardly displaced relatively near the first contact position of the clamping member with the decorated sheet because a friction force is applied to the first contact position of the clamping member with the decorated sheet. Thus, the first contact position of the clamping member with the decorated sheet is specified so as to locate a predetermined portion of the decorated sheet relatively near the first contact position of the clamping member with the decorated sheet. This hardly displaces the predetermined portion of the decorated sheet from a desired position when the clamping member presses the decorated sheet to the parting face. In other words, in order to prevent a displacement of the predetermine portion of the decorated sheet, the inclination of the surfaces of the decorated sheet may be adjusted such that the clamping member first comes into contact with the decorated sheet relatively near the predetermined portion of the decorated sheet. If the pattern of the decorated sheet contains a part requiring high positioning accuracy (e.g., a printed logo), the inclination of the surfaces of the decorated sheet is adjusted such that the part requiring high positioning accuracy is located relatively near the first contact position of the clamping member with the decorated sheet. Thus, the part requiring high positioning accuracy is hardly displaced when the clamping member presses the decorated sheet to the parting face. This improves the positioning accuracy and reproducibility of the part requiring high positioning accuracy in the pattern of the decorated sheet.

Hence, according to the present invention, even if the decorated sheet is separated from the parting face and tension is applied to the decorated sheet in the feeding direction of the decorated sheet before the clamping member comes into contact with the decorated sheet, the reproducibility of the part requiring high positioning accuracy in the pattern of the decorated sheet increases, improving the appearance of the molded article.

DESCRIPTION OF THE EMBODIMENTS

Figure 1C:
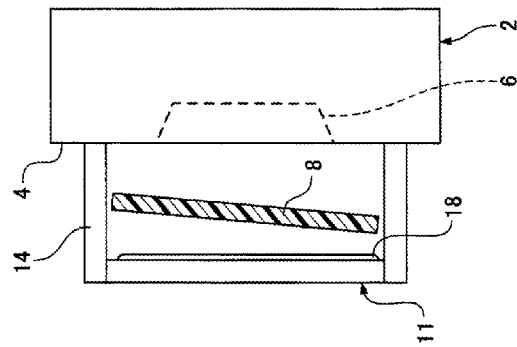
FIG. 1C is a front view illustrating the layout of the decorated sheet relative to the A die of the pair of molding/decorating dies in the in-mold decoration molding machine according to the first embodiment of the present invention.

Embodiments of the present invention will be described below with reference to the accompanying drawings. The same constituent elements are indicated by the same reference numerals and the explanation thereof is omitted. To enhance understanding, the schematic drawings mainly illustrate the constituent elements. Moreover, the thicknesses, lengths, and number of the illustrated constituent elements are different from those of the actual constituent elements for the creation of the drawings. The shapes, number, layout, and configuration of the constituent elements in the embodiments are merely exemplary and are not particularly limited. Thus, various modifications can be made without substantially departing from the advantage of the present invention.

(First Embodiment)

Figure 1A:
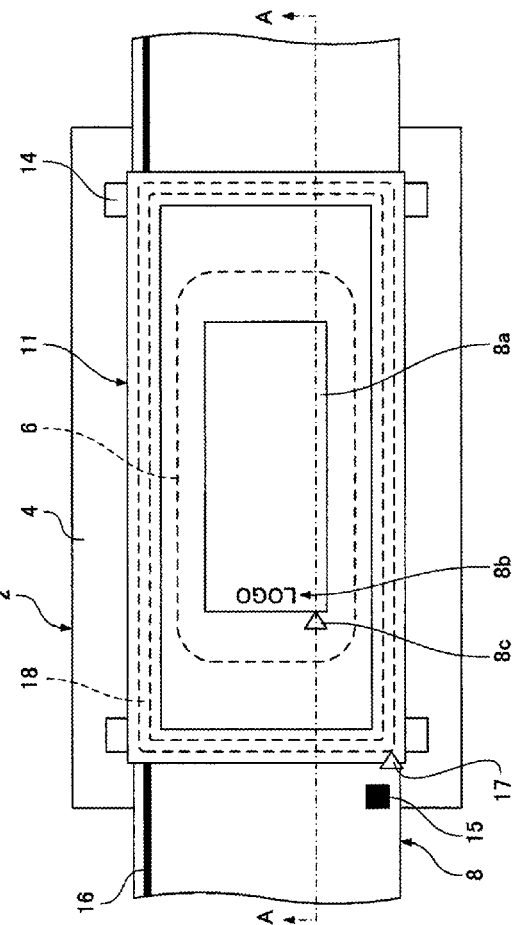
FIG. 1A is a plan view schematically illustrating the structure of an A die of a pair of molding/decorating dies and a decorated sheet in an in-mold decoration molding machine according to a first embodiment of the present invention.
Figure 1B:
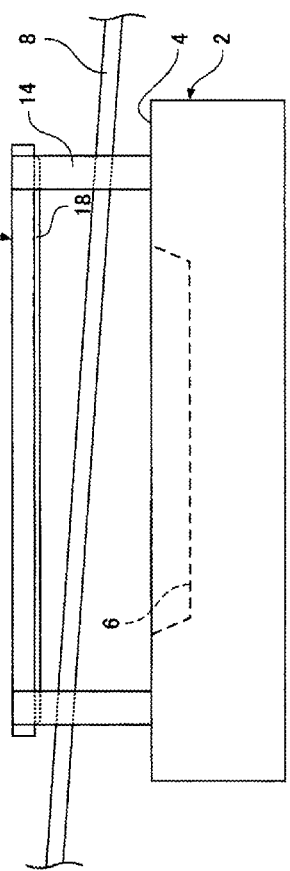
FIG. 1B is a side view illustrating the layout of the decorated sheet relative to the A die of the pair of molding/decorating dies in the in-mold decoration molding machine according to the first embodiment of the present invention.
Figure 2A:
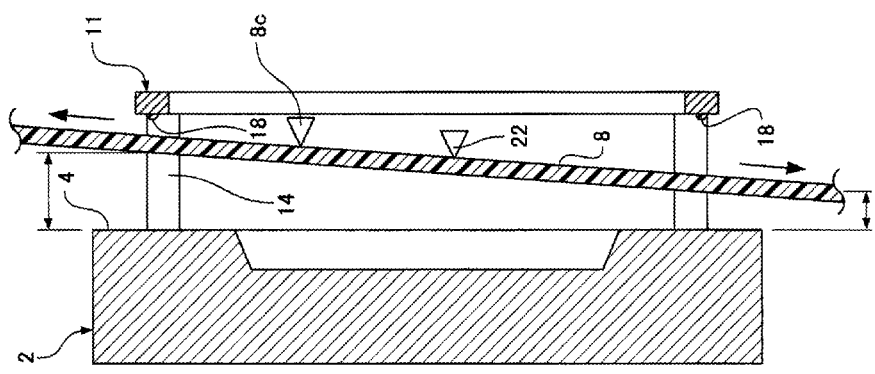
FIG. 2A is a cross-sectional view for explaining an operation of the in-mold decoration molding machine according to the first embodiment of the present invention.
Figure 2B:
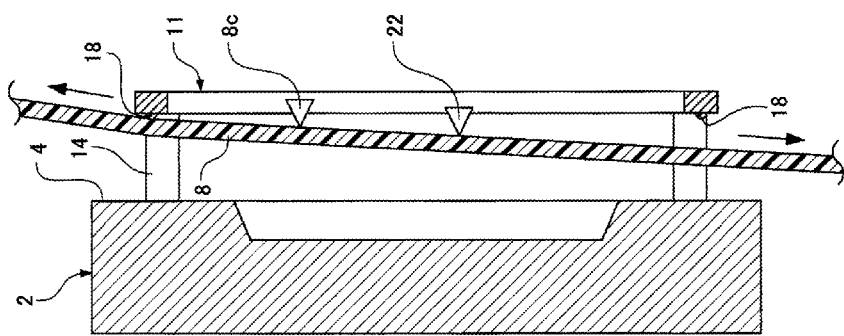
FIG. 2B is a cross-sectional view for explaining an operation of the in-mold decoration molding machine according to the first embodiment of the present invention.
Figure 2C:
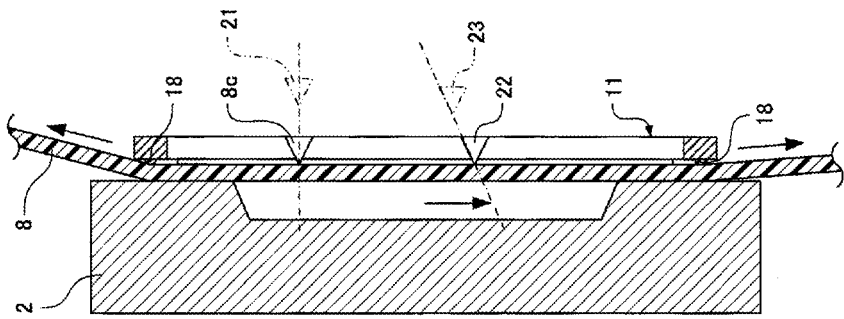
FIG. 2C is a cross-sectional view for explaining an operation of the in-mold decoration molding machine according to the first embodiment of the present invention.
Figure 3:
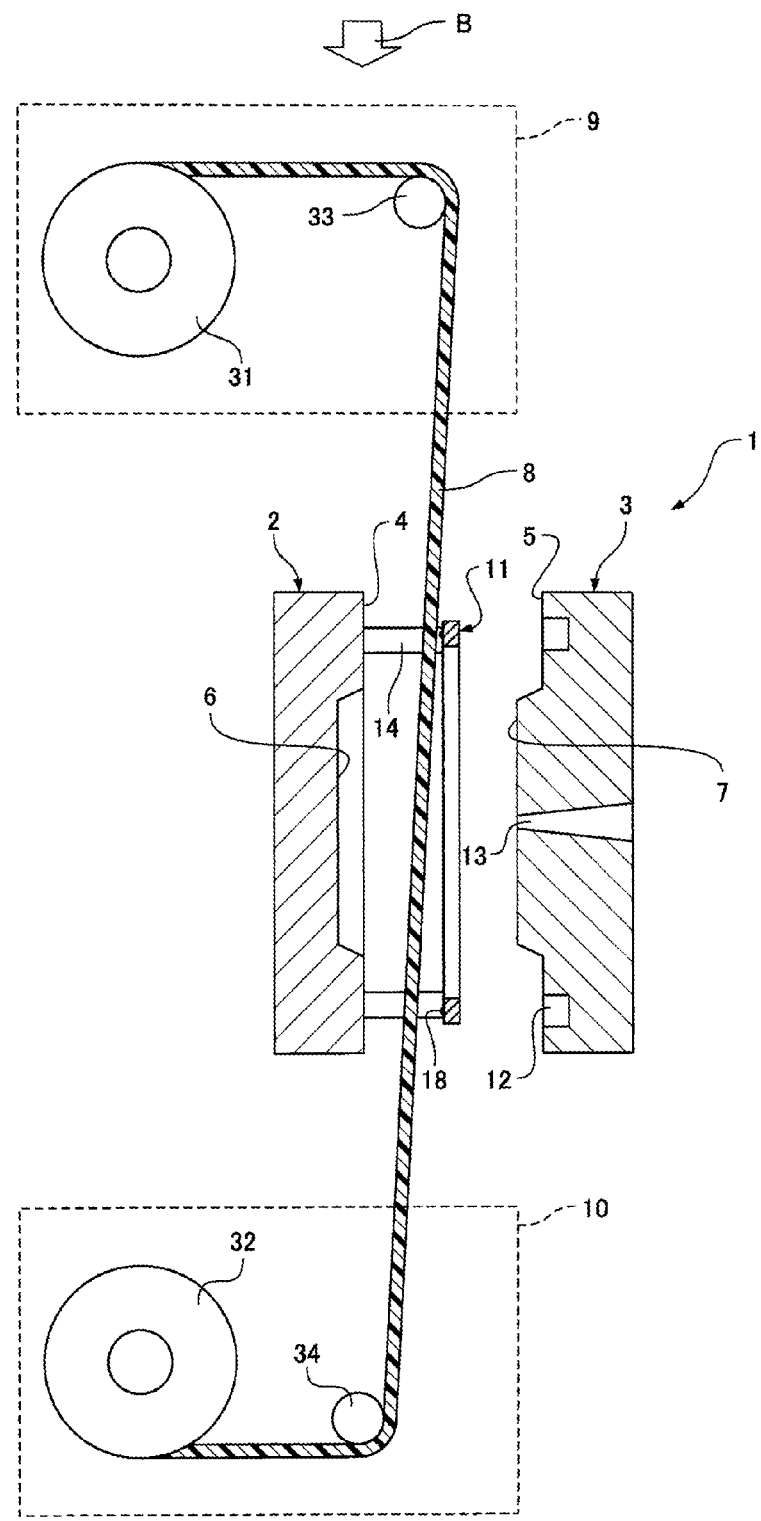
FIG. 3 is a cross-sectional view schematically illustrating the structure of the in-mold decoration molding machine according to the first embodiment of the present invention.

FIG. 1A is a plan view schematically illustrating the structure of an A die of a pair of molding/decorating dies and a decorated sheet in an in-mold decoration molding machine according to a first embodiment of the present invention. FIG. 1B is a side view illustrating the layout of the decorated sheet relative to the A die. FIG. 1C is a front view illustrating the layout of the decorated sheet relative to the A die. FIGS. 2A to 2C are cross-sectional views for explaining the operations of the in-mold decoration molding machine according to the first embodiment of the present invention. FIGS. 2A to 2C schematically illustrate the cross sections of the A die and the decorated sheet that are cut along the line A-A of FIG. 1A. FIG. 3 is a cross-sectional view schematically illustrating the structure of the in-mold decoration molding machine according to the first embodiment of the present invention.

As shown in FIG. 3, the in-mold decoration molding machine according to the first embodiment includes a pair of molding/decorating dies 1. The pair of molding/decorating dies 1 includes an A die 2 and a B die 3 that are openable dies. The pair of molding/decorating dies 1 has parting faces (a parting face 4 of the A die 2 and a parting face 5 of the B die 3) that are exposed when the A die 2 and the B die 3 are opened. When the pair of molding/decorating dies 1 (the A die 2 and the B die 3) is closed, a molding space (not shown) is formed between the A die 2 and the B die 3. The A die 2 has a concave cavity face 6 while the B die 3 has a convex cavity face 7 forming the molding space with the concave cavity face 6. The molding space formed in the pair of closed molding/decorating dies 1 contains a part of a long decorated sheet 8. Molten resin is supplied into the molding space containing the decorated sheet 8 and then the resin is injection-molded. Thus, when a molded article is formed, a pattern 8a (see FIG. 1A) held on the decorated sheet 8 is transferred to the surface of the molded article.

As shown in FIG. 3, the in-mold decoration molding machine according to the first embodiment includes a sheet feeder provided with a decorated sheet feeder 9 acting as a sheet feeding unit and a decorated sheet winder 10 acting as a sheet storage unit.

The decorated sheet feeder 9 feeds the long decorated sheet 8 to the pair of opened molding/decorating dies 1. The decorated sheet winder 10 stores the decorated sheet 8 fed from the pair of opened molding/decorating dies 1 by the decorated sheet feeder 9. Moreover, the decorated sheet winder 10 and the decorated sheet feeder 9 locate a part of the decorated sheet 8 in the range of the molding space in the pair of opened molding/decorating dies 1 while applying tension to the decorated sheet 8 in the feeding direction of the decorated sheet 8.

As shown in FIG. 3, the in-mold decoration molding machine according to the first embodiment further includes a clamping member 11. The clamping member 11 moves to the parting face of the pair of opened molding/decorating dies 1 and presses the decorated sheet 8 to the parting face. Specifically, the clamping member 11 moves toward the parting face 4 of the A die 2 having the concave cavity face 6 and presses the decorated sheet 8 to the parting face 4. The B die 3 has a concave portion 12 that accommodates the clamping member 11 so as to prevent the clamping member 11 from interfering with the B die 3 when the pair of molding/decorating dies 1 is closed.

As shown in FIG. 3, in the first embodiment, the B die 3 having the convex cavity face 7 further includes an injection port 13. When the pair of molding/decorating dies 1 is closed, molten resin is injected from the injection port 13 onto the decorated sheet 8 contained in the molding space, and then the injected resin fills the molding space.

In the first embodiment, the surfaces of the decorated sheet 8 are tilted with respect to the parting face 4 of the A die 2 by the decorated sheet feeder 9 and the decorated sheet winder 10 before a movement of the clamping member 11. As shown in FIGS. 1B and 1C, in the first embodiment, the surfaces of the decorated sheet 8 are tilted with respect to the parting face 4 of the A die 2 in the feeding direction of the decorated sheet 8 and are also tilted in a direction orthogonal to the feeding direction of the decorated sheet 8.

The surfaces of the decorated sheet 8 are tilted with respect to the parting face 4 of the A die 2 in the feeding direction of the decorated sheet 8 and in the direction orthogonal to the feeding direction of the decorated sheet 8. Thus, when the A die 2 and the decorated sheet 8 are viewed in the side view of FIG. 1B, the tilted surfaces of the decorated sheet 8 are actually recognized. Similarly, also when the A die 2 and the decorated sheet 8 are viewed in the front view of FIG. 1C, the tilted surfaces of the decorated sheet 8 are actually recognized. To enhance understanding, FIGS. 1B and 1C and other drawings do not illustrate the surfaces of the decorated sheet 8.

In the in-mold decoration molding machine according to the first embodiment, the surfaces of the decorated sheet 8 are tilted with respect to the parting face 4 of the A die 2. Thus, as shown in FIGS. 2A to 2C, at least one point of the clamping member 11 first comes into contact with the decorated sheet 8 according to the inclination of the surfaces of the decorated sheet 8 (FIG. 2B) during a movement of the clamping member 11, and then another point of the clamping member 11 comes into contact with the decorated sheet 8.

The in-mold decoration molding machine operates as will be described below according to the first embodiment, transferring the pattern 8a of the decorated sheet 8 to the surface of a molded article while injection-molding resin into the molded article.

First, the in-mold decoration molding machine locates a part of the decorated sheet 8 in the range of the molding space (not shown) in the pair of opened molding/decorating dies 1 while applying tension to the long decorated sheet 8 in the feeding direction of the decorated sheet 8. At this point, the surfaces of the decorated sheet 8 are tilted with respect to the parting face (the parting face 4 of the A die 2) of the pair of opened molding/decorating dies 1.

Subsequently, the in-mold decoration molding machine moves the clamping member 11 toward the parting face of the pair of opened molding/decorating dies 1 (the parting face 4 of the A die 2) and causes the clamping member 11 to press the decorated sheet 8 under tension to the parting face 4. At this point, at least one point of the clamping member 11 first comes into contact with the decorated sheet 8 according to the inclination of the surfaces of the decorated sheet 8, and then another point of the clamping member 11 comes into contact with the decorated sheet 8.

After the decorated sheet 8 is fixed to the parting face 4 of the A die 2 by the clamping member 11, the in-mold decoration molding machine closes the pair of molding/decorating dies 1 to form the molding space (not shown) in the pair of molding/decorating dies 1. Hence, a part of the long decorated sheet 8 is located in the molding space formed in the pair of molding/decorating dies 1.

Subsequently, the in-mold decoration molding machine injects molten resin (not shown) into the molding space and then cools and solidifies the resin.

Preferably, the decorated sheet 8 is fixed to the parting face 4 of the A die 2 by the clamping member 11, and then the decorated sheet 8 is vacuum-sucked to the concave cavity face 6 of the A die 2 before the pair of molding/decorating dies 1 is closed. The decorated sheet 8 is sucked to the concave cavity face 6 before molten resin is injected into the molding space, reducing the occurrence of breaks caused by a resin injection pressure on the decorated sheet 8.

When resin is solidified in the molding space (not shown), the in-mold decoration molding machine opens the pair of molding/decorating dies 1. This forms a molded article of solidified resin with the transferred pattern 8a held on the decorated sheet 8. The decorated molded article may be removed from the pair of molding/decorating dies 1 when the pair of molding/decorating dies 1 is opened.

According to the first embodiment, at least one point of the clamping member 11 first comes into contact with the decorated sheet 8 according to the inclination of the surfaces of the decorated sheet 8, and then another point of the clamping member 11 comes into contact with the decorated sheet 8. In other words, the first contact position of the clamping member 11 with the decorated sheet 8 is specified according to the inclination of the surfaces of the decorated sheet 8. The pattern 8a transferred to the surface of the molded article may be displaced by tension applied in the feeding direction of the decorated sheet 8 when the clamping member 11 presses the decorated sheet 8 to the parting face 4 of the A die 2, but the pattern 8a is hardly displaced relatively near the first contact position of the clamping member 11 with the decorated sheet 8 because a friction force is applied to the first contact position of the clamping member 11 with the decorated sheet 8. Thus, the first contact position of the clamping member 11 with the decorated sheet 8 is specified so as to locate a predetermined part of the decorated sheet 8 relatively near the first contact position of the clamping member 11 with the decorated sheet 8. This hardly displaces the predetermined part of the decorated sheet 8 from a desired position when the clamping member 11 presses the decorated sheet 8 to the parting face 4 of the A die 2. In order to prevent a displacement of the predetermined part of the decorated sheet 8, the inclination of the surfaces of the decorated sheet 8 may be adjusted such that the clamping member 11 first comes into contact with the decorated sheet 8 relatively near the predetermined part of the decorated sheet 8. If the pattern 8a of the decorated sheet 8 contains a part requiring high positioning accuracy (e.g., a logo 8b in the pattern 8a of the decorated sheet 8 as shown in FIG. 1A), the inclination of the surfaces of the decorated sheet 8 is adjusted such that the part requiring high positioning accuracy is located relatively near the first contact position of the clamping member 11 with the decorated sheet 8. Thus, the part requiring high positioning accuracy is hardly displaced when the clamping member 11 presses the decorated sheet 8 to the parting face 4. In other words, the inclination of the surfaces of the decorated sheet 8 is adjusted such that the clamping member 11 first comes into contact with the decorated sheet 8 relatively near the part requiring high positioning accuracy in the pattern 8a of the decorated sheet 8. Thus, the part requiring high positioning accuracy is hardly displaced. This improves the positioning accuracy and reproducibility of the part requiring high positioning accuracy in the pattern 8a of the decorated sheet 8.

Hence, according to the first embodiment, even if the decorated sheet 8 is separated from the parting face 4 of the A die 2 and tension is applied to the decorated sheet 8 in the feeding direction of the decorated sheet 8 before the clamping member 11 comes into contact with the decorated sheet 8, the reproducibility of the part requiring high positioning accuracy in the pattern 8a of the decorated sheet 8 increases and thus improves the appearance of the molded article.

For example, as shown in FIG. 1A, a reference point 8c is set for the printed logo 8b. If the surfaces of the decorated sheet 8 are inclined such that the reference point 8c is located relatively near the first contact position of the clamping member 11 with the decorated sheet 8, or conversely, the clamping member 11 first comes into contact with the decorated sheet 8 relatively near the reference point 8c of the logo 8b, as shown in FIGS. 2A to 2C, the reference point 8c is hardly displaced from a position (the initial position of the reference point 8c) 21 located on the reference point 8c relative to the A die 2 before the clamping member 11 is moved in a process during which the clamping member 11 presses the decorated sheet 8 to the parting face 4 of the A die 2. Since the reference point 8c of the logo 8b is hardly displaced, the logo 8b is also hardly displaced.

The in-mold decoration molding machine and the decorated sheet according to the first embodiment may have any configurations as follows:

In the first embodiment, as shown in FIG. 1A, the clamping member 11 shaped like a rectangular frame in plan view is provided on the A die 2. The clamping member 11 is pressed to the parting face 4 around the pattern 8a held on the decorated sheet 8. As a matter of course, the shape and layout of the clamping member 11 are not limited as long as the clamping member 11 can fix the decorated sheet 8 to the parting face 4 of the A die 2. Alternatively, the in-mold decoration molding machine may include a plurality of clamping members that fix the decorated sheet 8 to the parting face 4 of the A die 2.

As shown in FIG. 1A, the A die 2 further includes four rods 14 that move the clamping member 11 toward or away from the parting face 4 of the A die 2. When the rods 14 are moved down, the clamping member 11 presses the decorated sheet 8 downward so as to fix the decorated sheet 8 to the parting face 4. In the first embodiment, the rods 14 are connected to the clamping member 11 near the corners of the clamping member 11. As a matter of course, the positions and number of rods 14 are not limited. Furthermore, members for moving the clamping member 11 are not limited to the rods 14. Any members are applicable for moving the clamping member 11 as long as the clamping member 11 can be moved toward or away from the parting face 4 of the A die 2 without interfering with a movement of the decorated sheet 8 fed to the pair of opened molding/decorating dies 1.

The pattern 8a to be transferred to the molded article is printed beforehand on the decorated sheet 8. The pattern 8a includes the logo 8b requiring high positioning accuracy. The decorated sheet 8 includes a base sheet (not shown) and a transfer layer (not shown) on the base sheet. The transfer layer includes a decorated layer (not shown) having the printed pattern 8a. When the pair of molding/decorating dies 1 is opened, the transfer layer of the decorated sheet 8 is peeled from the decorated sheet 8 and is transferred to the surface of the molded article. The transfer layer may include a functional layer stacked on the decorated layer. The functional layer may be adjacent to the decorated layer or another layer may be disposed between the decorated layer and the functional layer. If the transfer layer includes the functional layer, the layer formed by transfer (transfer layer) on the surface of the molded article has a multilayer structure in which the functional layer capable of providing the surface of the molded article with a function, e.g., UV protection is stacked on the decorated layer having a printed pattern.

As shown in FIG. 1A, the decorated sheet 8 may have a printed alignment mark 15 for positioning the decorated sheet 8 in the feeding direction of the decorated sheet 8. The alignment mark 15 is preferably printed for each of the patterns 8a held on the decorated sheet 8. Moreover, as shown in FIG. 1A, the decorated sheet 8 may have a printed alignment line 16 for correcting the feeding direction of the decorated sheet 8. Generally, the feeding direction of the decorated sheet 8 is set in parallel with the center line of the concave cavity face 6 of the A die 2 in plan view. The alignment line 16 may be continuously printed along the feeding direction of the decorated sheet 8 or partially printed along the feeding direction of the decorated sheet 8. In the case of partial printing of the alignment line 16, the alignment line 16 may be preferably printed for each of the patterns 8a held on the decorated sheet 8. In the case where the alignment mark 15 and the alignment line 16 are printed on the decorated sheet 8, the in-mold decoration molding machine includes a camera (e.g., a CCD camera) or a sensor (e.g., a CCD sensor) for monitoring the alignment mark 15 and the alignment line 16. Monitoring of the alignment mark 15 and the alignment line 16 makes it easy to locate the pattern 8a of the decorated sheet 8 before the decorated sheet 8 is fixed by the clamping member 11. Only one of the alignment mark 15 and the alignment line 16 may be printed on the decorated sheet 8.

The logo 8b in the pattern 8a needs to be transferred to the surface of the molded article with high positioning accuracy. According to the first embodiment, as has been discussed, the surfaces of the decorated sheet 8 are tilted with respect to the parting face 4 such that the reference point 8c of the logo 8b is located relatively near the first contact position of the clamping member 11 with the decorated sheet 8. Thus, as shown in FIGS. 2A to 2C, the reference point 8c is hardly displaced from the initial position 21 located on the reference point 8c relative to the A die 2 before the clamping member 11 is moved in the process during which the clamping member 11 presses the decorated sheet 8 to the parting face 4 of the A die 2. This transfers the logo 8b to the surface of the molded article with high positioning accuracy.

In the first embodiment, as shown in FIG. 1A, the logo 8b is printed on the rear end (on the left in FIG. 1A) of the region of the pattern 8a in the feeding direction of the decorated sheet 8. Hence, the inclination of the surfaces of the decorated sheet 8 with respect to the parting face 4 is adjusted such that the rear end (on the left in FIG. 1A) of the clamping member 11 in the feeding direction of the decorated sheet 8 first comes into contact with the decorated sheet 8. This hardly displaces the logo 8b when the clamping member 11 presses the decorated sheet 8 to the parting face 4 of the A die 2.

The decorated sheet 8 may first come into contact with the overall rear end (on the left in FIG. 1A) of the clamping member 11 or a part of the rear end in the feeding direction of the decorated sheet 8. In the first embodiment, the decorated sheet 8 is fed to the pair of opened molding/decorating dies 1 diagonally in the feeding direction of the decorated sheet 8 and the direction orthogonal to the feeding direction of the decorated sheet 8 with respect to the parting face 4 of the A die 2 such that the decorated sheet 8 first comes into contact with one of the corners of the rear end of the clamping member 11 in the feeding direction of the decorated sheet 8.

In the first embodiment, as shown in FIG. 1A, the alignment mark 15 is printed on one of the ends of the decorated sheet 8 (the lower side of FIG. 1A) orthogonally to the feeding direction of the decorated sheet 8 and upstream of the pattern 8a in the feeding direction of the decorated sheet 8. As shown in FIG. 1B, the decorated sheet 8 is diagonally extended so as to be closer to the clamping member 11 on the upstream side (on the left in FIG. 1B) in the feeding direction of the decorated sheet 8 than on the downstream side (on the right in FIG. 1B) in the feeding direction of the decorated sheet 8. As shown in FIG. 1C, the decorated sheet 8 is diagonally extended so as to be closer to the clamping member 11 on the printed alignment mark 15 (the lower side in FIG. 1C) than on the opposite side of the decorated sheet 8 from the printed alignment mark 15 (the upper side in FIG. 1C). Hence, if the first contact position of the clamping member 11 with the decorated sheet 8 is defined as a clamping member reference position 17, as shown in FIG. 1A, the clamping member 11 first comes into contact with the decorated sheet 8 relatively near the alignment mark 15 in the first embodiment. Thus, in the case where the clamping member reference position 17 set relatively near the reference point 8c of the logo 8b is relatively close to the alignment mark 15, the reference point 8c of the logo 8b is reliably disposed relatively close to the clamping member reference position 17. This is because the pattern 8a is positioned relative to the alignment mark 15.

According to the first embodiment, as has been discussed, a friction force on the first contact position of the clamping member 11 with the decorated sheet 8 is applied such that the logo 8b is hardly displaced when the clamping member 11 presses the decorated sheet 8 to the parting face 4 of the A die 2. Hence, on the surfaces of the clamping member 11 coming into contact with the decorated sheet 8, at least the first contact point with the decorated sheet 8 preferably has a friction resistance that is large enough to prevent the decorated sheet 8 from sliding on the clamping member 11 when the clamping member 11 presses the decorated sheet 8 to the parting face 4 of the A die 2. More preferably, on one surface of the clamping member 11 coming into contact with the decorated sheet 8, one of the upstream side in the feeding direction of the decorated sheet 8 (e.g., the left end of the clamping member 11 in FIG. 1A) and the downstream side in the feeding direction of the decorated sheet 8 (e.g., the right end of the clamping member 11 in FIG. 1A) is closer to the decorated sheet 8 and has a friction resistance that is large enough to prevent the decorated sheet 8 from sliding on the clamping member 11 before a movement of the clamping member 11.

The clamping member 11 may include an anti-slip member protruding from the surface of the clamping member 11 facing the decorated sheet 8, the anti-slip member preventing the decorated sheet 8 from sliding at the first contact position of the clamping member 11 with the decorated sheet 8. In the case where the clamping member 11 includes the anti-slip member, the decorated sheet 8 is fixed to the clamping member 11 by the anti-slip member at the first contact position of the clamping member 11 with the decorated sheet 8. The anti-slip member has a friction resistance that is large enough to prevent the decorated sheet 8 from sliding on the clamping member 11 when the clamping member 11 presses the decorated sheet 8 to the parting face 4 of the A die 2. For example, the anti-slip member may be a rubber member. In the first embodiment, as shown in FIG. 1A, a loop-shaped anti-slip member 18 is used. The loop-shaped anti-slip member 18 may be, for example, an O ring. The anti-slip member needs to be provided at least at the first contact position of the clamping member 11 with the decorated sheet 8. More preferably, on the surface of the clamping member 11 coming into contact with the decorated sheet 8, the anti-slip member is more preferably provided near one of the upstream side in the feeding direction of the decorated sheet 8 (e.g., the left end of the clamping member 11 in FIG. 1A) and the downstream side in the feeding direction of the decorated sheet 8 (e.g., the right end of the clamping member 11 in FIG. 1A) so as to be closer to the decorated sheet 8 before a movement of the clamping member 11.

As has been discussed, in the first embodiment, the decorated sheet 8 is fed to the pair of opened molding/decorating dies 1 diagonally in the feeding direction of the decorated sheet 8 and the direction orthogonal to the feeding direction of the decorated sheet 8 with respect to the parting face 4 of the A die 2. Thus, the decorated sheet 8 starts coming into contact with the clamping member 11 from the clamping member reference position 17 in FIG. 1A. As the decorated sheet 8 is pressed down by the clamping member 11, the decorated sheet 8 is fixed to the A die 2 from the clamping member reference position 17.

Referring to FIGS. 2A to 2C, a process of pressing the decorated sheet 8 to the parting face 4 of the A die 2 by means of the clamping member 11 will be described below.

FIG. 2A shows that the decorated sheet 8 fed into the pair of opened molding/decorating dies 1 is positioned with respect to the A die 2. In the first embodiment, the decorated sheet 8 is tilted such that one surface of the decorated sheet 8 is farther from the parting face 4 of the A die 2 on the upstream side (the upper side of FIG. 2A) in the feeding direction of the decorated sheet 8 than on the downstream side (the lower side of FIG. 2A) in the feeding direction of the decorated sheet 8.

At this point, in order to prevent deformation of the decorated sheet 8, tension is applied to two sides (the upstream and downstream sides) of the decorated sheet 8 in the feeding direction of the decorated sheet 8 as indicated by arrows in FIG. 2A.

In FIG. 2B, the clamping member 11 starts coming into contact with the decorated sheet 8. In the first embodiment, the rear end of the clamping member 11 (the upper side of FIG. 2B) in the feeding direction of the decorated sheet 8 first comes into contact with the decorated sheet 8. At this point, the contact portion of the decorated sheet 8 with the rear end of the clamping member 11 is held by the anti-slip member 18 with respect to the clamping member 11. The front end of the clamping member 11 (the lower side of FIG. 2B) in the feeding direction of the decorated sheet 8 does not come into contact with the decorated sheet 8. Hence, of tension applied to the two sides in the feeding direction of the decorated sheet 8, only the tension pulling the decorated sheet 8 downstream (to the side where the clamping member 11 is not in contact with the decorated sheet 8) in the feeding direction of the decorated sheet 8 remains. Thus, on the downstream side of the feeding direction of the decorated sheet 8 from the position of the decorated sheet 8 held by the anti-slip member 18, the decorated sheet 8 is pulled only downstream in the feeding direction of the decorated sheet 8.

FIG. 2C shows that the decorated sheet 8 is fixed to the parting face 4 by the clamping member 11. In the steps of FIGS. 2B and 2C, the front end of the clamping member 11 (the lower side of FIG. 2C) in the feeding direction of the decorated sheet 8 finally comes into contact with the decorated sheet 8. Hence, the decorated sheet 8 is fixed to the parting face 4 while the pattern 8*a* of the decorated sheet 8 is stretched downstream in the feeding direction of the decorated sheet 8 by the tension applied downstream in the feeding direction of the decorated sheet 8.

As has been discussed, the decorated sheet 8 is held on the rear end of the clamping member 11 (the upper side of FIG. 2B) in the feeding direction of the decorated sheet 8 at the beginning of a movement of the clamping member 11. As shown in FIG. 1A, the logo 8*b* is printed on the upstream side (on the left in FIG. 1A) in the region of the pattern 8*a* in the feeding direction of the decorated sheet 8. Hence, as shown in FIGS. 2A to 2C, the reference point 8*c* of the logo 8*b* is displaced from the initial position 21 less than an amount by which a downstream point 22 is displaced from an initial position 23 in the feeding direction of the decorated sheet 8 in the region of the pattern 8*a*. In this case, the initial position 23 corresponds to the position of the downstream point 22 with respect to the A die 2 before a movement of the clamping member 11. The downstream point 22 does not particularly require positioning accuracy in the pattern 8*a*.

In the first embodiment, the surfaces of the decorated sheet 8 are tilted with respect to the parting face 4 of the A die 2 such that the reference point of a pattern held on the decorated sheet 8 is relatively close to the clamping member 11. This hardly displaces the reference point of the pattern from the positioned reference point of the pattern before the decorated sheet 8 is fixed by the clamping member 11. Thus, the pattern is transferred to the surface of the molded article with high positioning accuracy.

A pattern such as a logo requiring high positioning accuracy serves as a positioning reference for all patterns to be transferred to the surface of the molded article from the decorated sheet 8. According to the first embodiment, the reference point 8*c* for the logo pattern is positioned with high reproducibility and high accuracy on the surface of the molded article. Thus, the first embodiment can improve the appearance of the molded article.

According to the first embodiment, the occurrence of displacements from the initial position decreases toward the first contact position of the clamping member 11 with the decorated sheet 8 in the pattern. Thus, the decorated sheet 8 is preferably tilted with respect to the parting face 4 of the A die 2 such that the reference point for a pattern such as a logo requiring high positioning accuracy comes close to the first contact position of the clamping member 11 with the decorated sheet 8.

Figure 4:
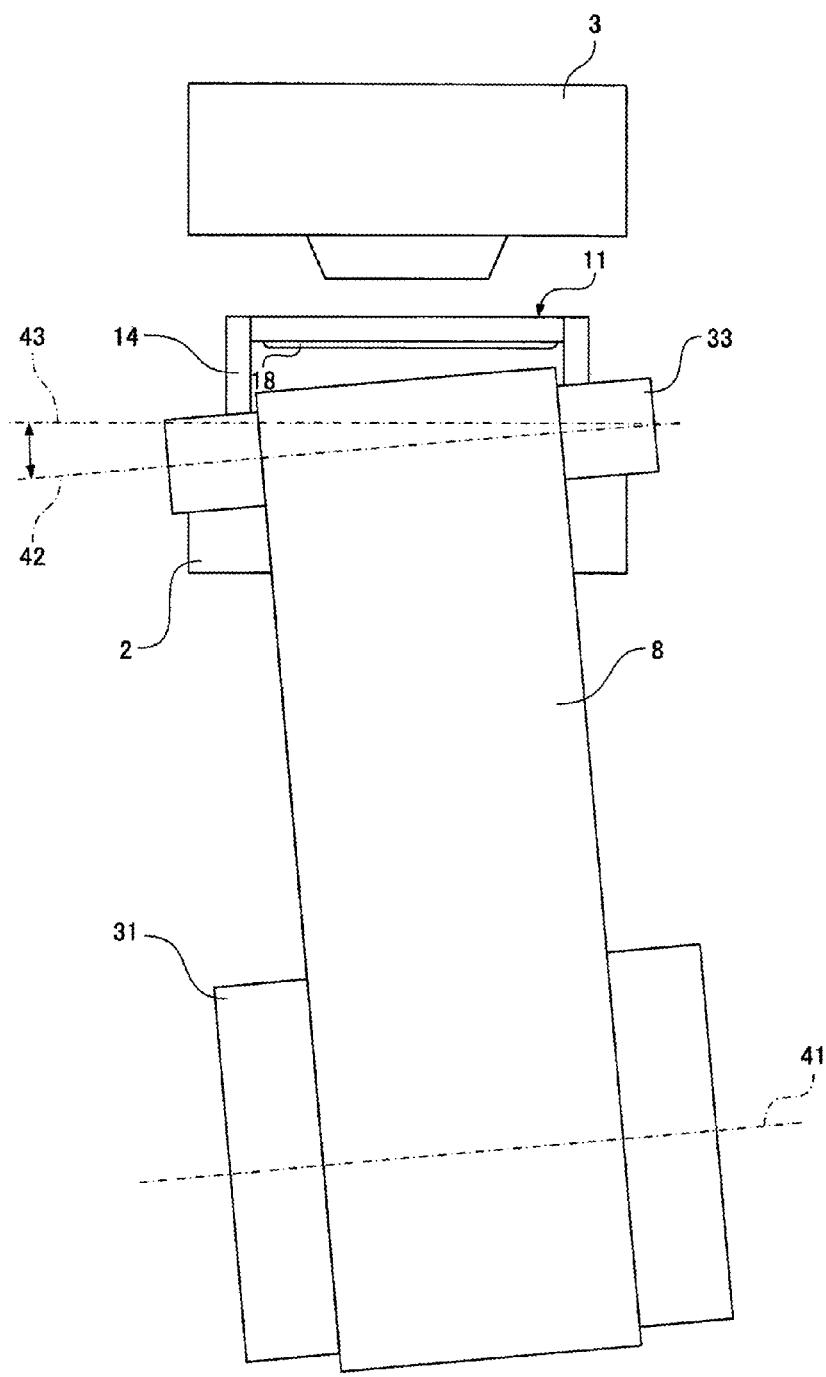
FIG. 4 schematically illustrates the structure of the in-mold decoration molding machine viewed along an arrow B of FIG. 3 according to the first embodiment of the present invention.

Referring to FIGS. 3 and 4, a structural example of the decorated sheet feeder 9 and the decorated sheet winder 10 will be described below.

As shown in FIG. 3, the decorated sheet 8 is fed between the pair of opened molding/decorating dies 1 (the A die 2 and the B die 3) by the decorated sheet feeder 9 and the decorated sheet winder 10. In the first embodiment, the decorated sheet feeder 9 includes a sheet roll 31 while the decorated sheet winder 10 includes a winding roll 32. The sheet roll 31 is wound with a roll of the decorated sheet 8 while the decorated sheet 8 fed from the sheet roll 31 is wound around the winding roll 32 into a roll. The winding roll 32 is wound with the decorated sheet fed from the pair of opened molding/decorating dies 1 after the pattern is transferred to the molded article. Thus, the decorated sheet is wound around the winding roll 32 after the pattern is peeled off.

The sheet roll 31 and the winding roll 32 are disposed in parallel with each other and are rotated by respective motors (not shown). Moreover, the sheet roll 31 and the winding roll 32 driven by the respective motors (not shown) generate torque to apply tension to the two sides of the decorated sheet 8 in the feeding direction of the decorated sheet 8. This prevents deformation of the decorated sheet 8. In this case, the tension applied to the decorated sheet 8 by the sheet roll 31 and the winding roll 32 is desirably small tension of about 0.1 kN to 1 kN. This is because the tension hardly stretches (deforms) the decorated sheet 8 so as to position the pattern with higher accuracy.

As shown in FIG. 3, the decorated sheet feeder 9 and the decorated sheet winder 10 are opposed to each other in parallel, with the pair of molding/decorating dies 1 interposed between the decorated sheet feeder 9 and the decorated sheet winder 10. The decorated sheet feeder 9 and the decorated sheet winder 10 respectively include guide rolls 33 and 34 for hanging the long decorated sheet 8. In this case, as shown in FIG. 3, the central axes of the guide rolls 33 and 34 may be disposed at different distances from a plane flush with the parting face of the pair of opened molding/decorating dies 1 (the parting face 4 of the A die 2) or the central axes of the guide rolls 33 and 34 may be disposed in the opposite directions with respect to the plane flush with the parting face of the pair of opened molding/decorating dies 1 (the parting face 4 of the A die 2) such that the surfaces of the decorated sheet 8 are tilted with respect to the parting face of the pair of molding/decorating dies 1 in the feeding direction of the decorated sheet 8. With this configuration, the surfaces of the decorated sheet 8 are tilted according to the positions of the central axes of the guide rolls 33 and 34 with respect to the parting face 4 of the A die 2 in the feeding direction of the decorated sheet 8.

As shown in FIG. 1C, the central axes of the guide rolls 33 and 34 may be tilted with respect to the plane flush with the parting face of the pair of opened molding/decorating dies 1 (the parting face 4 of the A die 2) such that the surfaces of the decorated sheet 8 are tilted with respect to the parting face 4 of the A die 2 in the direction orthogonal to the feeding direction of the decorated sheet 8. Thus, the surfaces of the decorated sheet 8 are tilted with respect to the parting face 4 of the A die 2 at an angle corresponding to the inclination of the central axes of the guide rolls 33 and 34 in the direction orthogonal to the feeding direction of the decorated sheet 8.

FIG. 4 schematically illustrates the structure of the in-mold decoration molding machine viewed along arrow B according to the first embodiment of the present invention. The sheet roll 31 and the guide roll 33 of the decorated sheet feeder 9 are tilted with respect to the parting face of the pair of molding/decorating dies 1. In FIG. 4, the pattern, the alignment mark, and the alignment line printed on the decorated sheet 8 are omitted.

As shown in FIG. 1C, the surfaces of the decorated sheet 8 are tilted with respect to the parting face 4 of the A die 2 in the direction orthogonal to the feeding direction of the decorated sheet 8. With this configuration, as shown in FIG. 4, central axes 41 and 42 of the sheet roll 31 and the guide roll 33 in the decorated sheet feeder 9 are tilted with respect to a plane 43 flush with the parting face of the pair of opened molding/decorating dies 1 (the parting face of the A die 2). The central axes (not shown) of the winding roll 32 and the guide roll 34 in the decorated sheet winder 10 are also tilted like the central axes of the sheet roll 31 and the guide roll 33 included in the decorated sheet feeder 9.

Alternatively, only the guide roll 33 of the decorated sheet feeder 9 and the guide roll 34 of the decorated sheet winder 10 may be diagonal to the plane flush with the parting face 4 of the A die.

In the first embodiment, as shown in FIGS. 1B and 1C, the surfaces of the decorated sheet 8 may be tilted with respect to the parting face 4 of the A die 2 in the feeding direction of the decorated sheet 8 and the direction orthogonal to the feeding direction of the decorated sheet 8. The surfaces of the decorated sheet 8 do not always need to be tilted both in the feeding direction of the decorated sheet 8 and the direction orthogonal to the feeding direction of the decorated sheet 8. The direction of inclination of the surfaces of the decorated sheet 8 with respect to the parting face 4 of the A die 2 depends upon the first contact portion of the clamping member 11 with the decorated sheet 8. In other words, the direction of inclination of the surfaces of the decorated sheet 8 depends upon the set position of the reference point for a pattern such as a logo requiring high positioning accuracy in the whole pattern. Hence, for example, the surfaces of the decorated sheet 8 may be tilted with respect to the parting face 4 of the A die 2 only in the feeding direction of the decorated sheet 8 or the surfaces of the decorated sheet 8 may be tilted with respect to the parting face 4 of the A die 2 only in the direction orthogonal to the feeding direction of the decorated sheet 8.

(Second Embodiment)

Figure 5A:
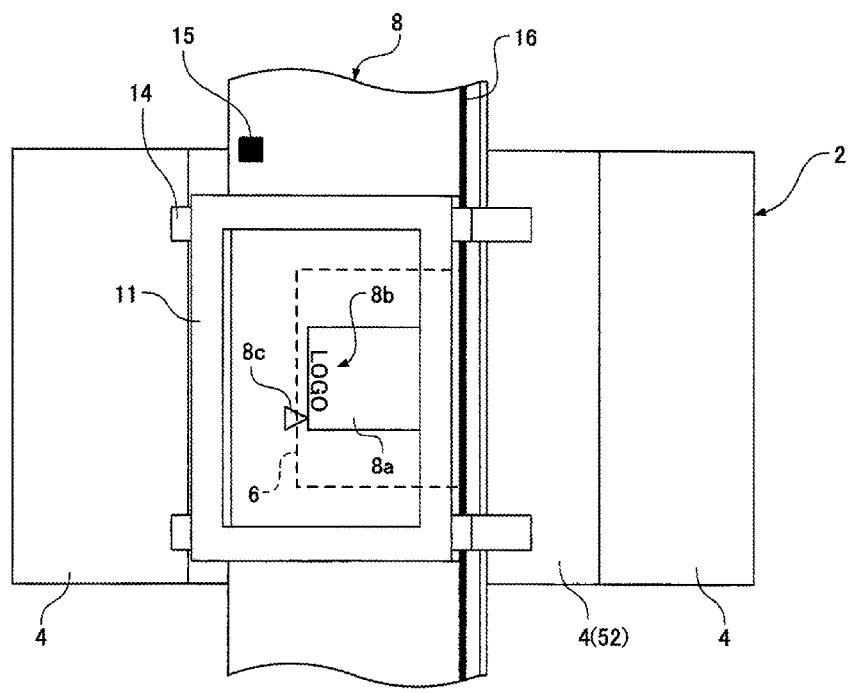
FIG. 5A is a plan view schematically illustrating the structure of an A die of a pair of molding/decorating dies and a decorated sheet in an in-mold decoration molding machine according to a second embodiment of the present invention.
Figure 5B:
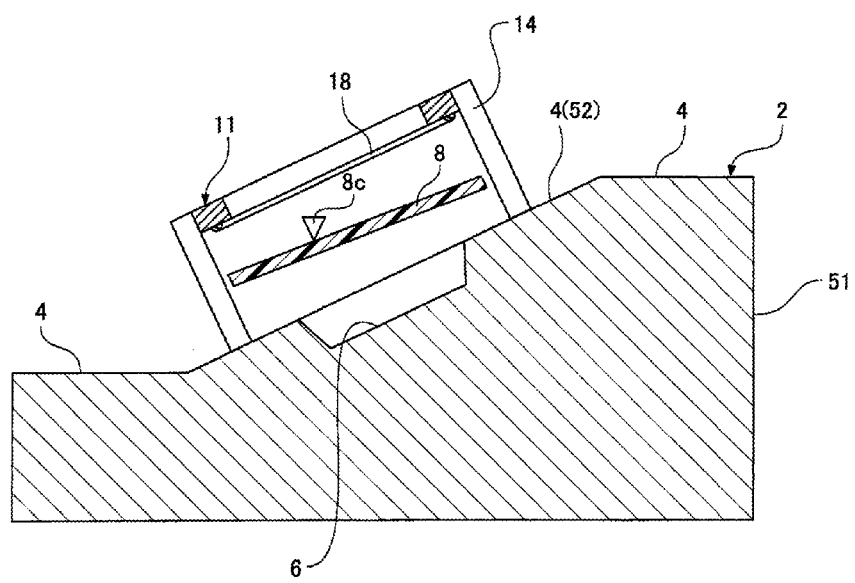
FIG. 5B is a cross-sectional view illustrating the layout of the decorated sheet relative to the A die of the pair of molding/decorating dies in the in-mold decoration molding machine according to the second embodiment of the present invention.
Figure 6B:
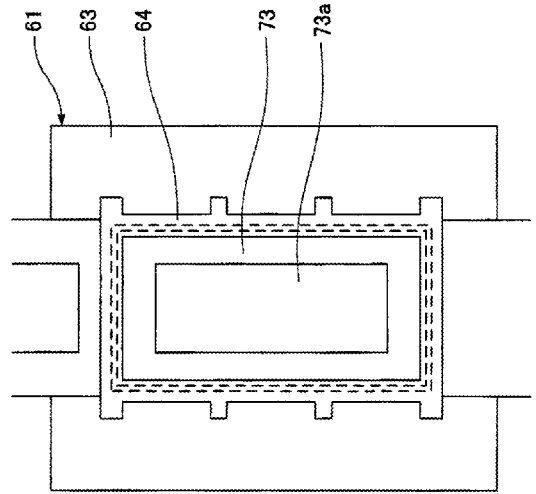
FIG. 6B is a plan view schematically illustrating the part face of an A die included in the molding machine described in Japanese Patent Laid-Open No. 2011-025531.
Figure 6A:
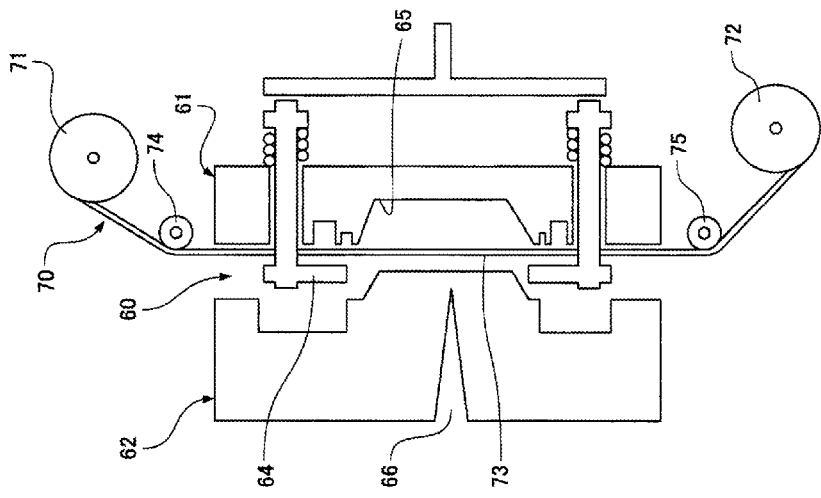
FIG. 6A is a cross-sectional view schematically illustrating a molding machine described in Japanese Patent Laid-Open No. 2011-025531.

In a second embodiment, only different points from the first embodiment will be described below. FIG. 5A is a plan view schematically illustrating the structure of an A die of a pair of molding/decorating dies and a decorated sheet in an in-mold decoration molding machine according to the second embodiment of the present invention. FIG. 5B is a cross-sectional view illustrating the layout of the decorated sheet with respect to the A die. Members corresponding to the respective members of the first embodiment are indicated by the same reference numerals as in the first embodiment.

The second embodiment is different from the first embodiment in that the parting faces of a pair of molding/decorating dies 1 each include an inclined surface having a cavity face. FIG. 5B illustrates an inclined surface (a part of the parting face) 52 diagonal to a platen surface 51 of an A die 2.

In the case where the cavity face is formed on the inclined surface (a part of the parting face), a decorated sheet 8 is held on the inclined surface 52 of the A die 2 by a clamping member 11. Also in this case, the surfaces of the decorated sheet 8 are tilted with respect to the inclined surface of the A die 2 as in the first embodiment such that a reference point for the pattern of the decorated sheet 8 comes relatively close to the clamping member 11. Thus, the positioned reference point for the pattern is hardly displaced before the decorated sheet 8 is fixed by the clamping member 11. This transfers the pattern to the surface of a molded article with high positioning accuracy.

For example, in the case where a logo 8b is printed on one end (on the left in FIG. 5A) in the region of a pattern 8a in a direction orthogonal to the feeding direction of the decorated sheet 8 as shown in FIG. 5A, the surfaces of the decorated sheet 8 are tilted such that the decorated sheet 8 is closer to the clamping member 11 on the printed logo 8b (on the left in FIG. 5B) than on an opposite side from the printed logo 8b (on the right in FIG. 5B) as shown in FIG. 5B. Thus, as in the first embodiment, a reference point 8c for the logo 8b is relatively close to the first contact position of the clamping member 11 with the decorated sheet 8. As in the first embodiment, the reference point 8c positioned with respect to the A die 2 before a movement of the clamping member 11 is hardly displaced when the clamping member 11 presses the decorated sheet 8 to the inclined surface 52 of the A die 2. Since the reference point 8c for the logo 8b is hardly displaced, the logo 8b is also hardly displaced.

Some exemplary embodiments were specifically described according to the present invention. Those skilled in the art could easily understand new teachings of the present invention and various modifications that can be made in the exemplary embodiments without substantially departing from the effect of the present invention. Hence, such modifications are intended to be within the scope of the present invention.

What is claimed is:

1. An in-mold decoration molding method in which a part of a long decorated sheet is disposed in a molding space formed in dies, and then a pattern held on the decorated sheet is transferred to a surface of a molded article while molten resin is injected into the molding space so as to be injection-molded into the molded article, the method comprising the steps of:
disposing the part of the decorated sheet in a range of the molding space with surfaces of the long decorated sheet tilted with respect to a parting face of the opened dies while applying tension to the decorated sheet in a feeding direction of the decorated sheet; and
moving a clamping member to the parting face so as to press the decorated sheet under tension to the parting face by the clamping member such that a part of the clamping member first comes into contact with the decorated sheet at a position determined by inclination of the surfaces of the decorated sheet and then another portion of the clamping member comes into contact with the decorated sheet.

2. The in-mold decoration molding method according to claim 1, wherein the long decorated sheet is looped over a pair of rolls opposed to each other with the dies interposed between the rolls such that central axes of the rolls are disposed in opposite directions with respect to a plane flush with the parting face of the opened dies or are disposed in an identical direction with respect to the plane and at different distances from the plane, and the surfaces of the decorated sheet are tilted with respect to the parting face at an angle corresponding to positions of the central axes of the rolls in the feeding direction of the decorated sheet before the movement of the clamping member.

3. The in-mold decoration molding method according to claim 1, wherein the long decorated sheet is looped over a pair of rolls opposed to each other with the dies interposed between the rolls such that central axes of the rolls are tilted with respect with a plane flush with the parting face of the opened dies, and the surfaces of the decorated sheet are tilted with respect to the parting face at an angle corresponding to inclination of the central axes of the rolls in a direction orthogonal to the feeding direction of the decorated sheet before the movement of the clamping member.

4. The in-mold decoration molding method according to claim 1, wherein the long decorated sheet is looped over a pair of rolls opposed to each other with the dies interposed between the rolls such that central axes of the rolls are tilted with respect with a plane flush with the parting face of the opened dies and are disposed in opposite directions with respect to the plane, or are disposed in an identical direction with respect to the plane and at different distances from the plane, and the surfaces of the decorated sheet are tilted with respect to the parting face at an angle corresponding to inclination of the central axes of the rolls in a direction orthogonal to the feeding direction of the decorated sheet and are tilted with respect to the parting face at an angle corresponding to positions of the central axes of the rolls in the feeding direction of the decorated sheet before the movement of the clamping member.

5. The in-mold decoration molding method according to claim 1, wherein when the clamping member moves, the method further comprises the step of:

fixing the decorated sheet with respect to the clamping member by an anti-slip member at a first contact position of the clamping member with the decorated sheet, the anti-slip member protruding from a surface of the clamping member facing the decorated sheet.

6. The in-mold decoration molding method according to claim 5, wherein the anti-slip member is an O ring.

7. The in-mold decoration molding method according to claim 1, wherein the decorated sheet is tilted with respect to the parting face such that a reference point for a predetermined portion of the decorated sheet is located closer to the first contact position of the clamping member with the decorated sheet than a final contact position of the clamping member with the decorated sheet.

8. An in-mold decoration molding machine in which a part of a long decorated sheet is disposed in a molding space formed in dies, and then a pattern held on the decorated sheet is transferred to a surface of a molded article while molten resin is injected into the molding space so as to be injection-molded into the molded article, the in-mold decoration molding machine comprising:
the openable molds that are opened with a parting face and are closed so as to form the molding space;
a sheet feeder including a sheet feeding unit and a sheet storage unit, the sheet feeder disposing the part of the decorated sheet in a range of the molding space by feeding the decorated sheet from the sheet feeding unit to the opened dies with surfaces of the decorated sheet tilted with respect to the parting face of the opened dies while applying tension to the long decorated sheet in a feeding direction of the decorated sheet, and storing the decorated sheet from the opened dies in the sheet storage unit; and a clamping member that moves to the parting face so as to press the decorated sheet under tension to the parting face such that the clamping member first comes into contact with the decorated sheet at a position determined by inclination of the surfaces of the decorated sheet and then comes into contact with the decorated sheet at another position.

9. The in-mold decoration molding machine according to claim 8, wherein each of the sheet feeding unit and the sheet storage unit includes a roll, the long decorated sheet being looped over the rolls opposed to each other with the dies interposed between the rolls such that central axes of the rolls are disposed in opposite directions with respect to a plane flush with the parting face of the opened dies or are disposed in an identical direction with respect to the plane and at different distances from the plane, and the surfaces of the decorated sheet are tilted with respect to the parting face at an angle corresponding to positions of the central axes of the rolls in the feeding direction of the decorated sheet before the movement of the clamping member.

10. The in-mold decoration molding machine according to claim 8, wherein each of the sheet feeding unit and the sheet storage unit includes a roll, the long decorated sheet being looped over the rolls opposed to each other with the dies interposed between the rolls such that central axes of the rolls are tilted with respect with a plane flush with the parting face of the opened dies, and the surfaces of the decorated sheet are tilted with respect to the parting face at an angle corresponding to inclination of the central axes of the rolls in a direction orthogonal to the feeding direction of the decorated sheet before the movement of the clamping member.

11. The in-mold decoration molding machine according to claim 8, wherein each of the sheet feeding unit and the sheet storage unit includes a roll, the long decorated sheet being looped over the rolls opposed to each other with the dies interposed between the rolls such that central axes of the rolls are tilted with respect with a plane flush with the parting face of the opened dies and are disposed in opposite directions with respect to the plane, or are disposed in an identical direction with respect to the plane and at different distances from the plane, and the surfaces of the decorated sheet are tilted with respect to the parting face at an angle corresponding to inclination of the central axes of the rolls in a direction orthogonal to the feeding direction of the decorated sheet and are tilted with respect to the parting face at an angle corresponding to positions of the central axes of the rolls in the feeding direction of the decorated sheet before the movement of the clamping member.

12. The in-mold decoration molding machine according to claim 8, further comprising an anti-slip member that protrudes from a surface of the clamping member facing the decorated sheet, the anti-slip member fixing the decorated sheet with respect to the clamping member at a first contact position of the clamping member with the decorated sheet.

13. The in-mold decoration molding machine according to claim 12, wherein the anti-slip member is an O ring.

14. The in-mold decoration molding machine according to claim 8, wherein the decorated sheet is tilted with respect to the parting face such that a reference point for a predetermined portion of the decorated sheet is located closer to the first contact position of the clamping member with the decorated sheet than a final contact position of the clamping member with the decorated sheet.

\* \* \* \* \*